United States Patent [19]

Burke

[11] Patent Number: 5,000,489
[45] Date of Patent: Mar. 19, 1991

[54] SERVICE SADDLE

[76] Inventor: David W. Burke, 809 Taylor St., Bay City, Mich. 48708

[21] Appl. No.: 509,195

[22] Filed: Apr. 16, 1990

[51] Int. Cl.⁵ ............................................... F16L 35/00
[52] U.S. Cl. ........................................ 285/24; 285/197
[58] Field of Search ................. 285/197, 198, 199, 24, 285/27

[56] References Cited

U.S. PATENT DOCUMENTS

| | | | |
|---|---|---|---|
| 3,406,988 | 10/1968 | Jones | 285/24 |
| 3,844,590 | 10/1974 | de la Fuente Burton | 285/197 |
| 3,967,839 | 7/1976 | Dunmire | 285/330 X |
| 4,073,513 | 2/1978 | Blakeley | 285/197 X |

*Primary Examiner*—Randolph A. Reese
*Assistant Examiner*—Heather Chun
*Attorney, Agent, or Firm*—Merlin B. Davey

[57] ABSTRACT

This invention provides a pipe saddle assembly comprising (a) an insert housing having an outer open end and an inner open end, the inner open end being adapted for positioning adjacent to and around an opening in the wall of a pipe; (b) an insert having an outer end, an opposite inner end and an opening extending through the insert from its inner end to its outer end, the insert being positioned in the housing such that the inner ends and outer ends of the insert and the housing are respectively adjacent each other; (c) the inner end of the insert being adapted for positioning adjacent to and around the opening in the wall of the pipe; (d) the outer end of the insert being adapted to operatively engage a take-off means; and (e) the insert housing having means adapted to receive and engage the take-off means such that the take-off means holds the insert in a sealing position around the opening in the pipe and against the take-off means.

3 Claims, 1 Drawing Sheet

SERVICE SADDLE

BACKGROUND OF THE INVENTION

This invention relates to pipe saddle assemblies and more particularly to such assemblies comprising a unique insert providing improved sealing and ease of installation.

Pipe saddle assemblies, or service saddles as they are commonly called, are principally used for branch connections when connecting a secondary pipe line or service lateral into, for example, an underground water line. The saddles are generally assembled in the field and usually in highly confined areas within a ditch Further, they must often be attached to the main line when such line is under high fluid pressure Various methods and assemblies for making such connections are known in the art. See, for example, U.S. Pat. Nos. 2,050,985 and 2,100,884 of W. W. Trickey where a specially designed insert is bolted into the saddle assembly Valenziano, in U.S. Pat. No. 3,364,939 employs a hardenable plastic and a fluid tight chamber over the region of the proposed tap so the outside of the tapping region can be subjected to the same pressure in the main pipe. Dunmire, in U.S. Pat. No. 3,967,839, employs an insert-type outlet arrangement which requires a specially designed insert which is necessary to prevent outward spreading of the insert and deformation of the threaded portion utilized in connecting the secondary pipe.

SUMMARY OF THE INVENTION

This invention provides a pipe saddle assembly comprising a unique insert providing improved sealing and ease of installation. More particularly, the invention provides a pipe saddle assembly comprising (a) an insert housing having an outer open end and an inner open end, the inner open end being adapted for positioning adjacent to and around an opening in the wall of a pipe; (b) an insert having an outer end, an opposite inner end and an opening extending through the insert from its inner end to its outer end, said insert being positioned in said housing such that the inner ends and outer ends of said insert and said housing are respectively adjacent each other; (c) said inner end of said insert being adapted for positioning adjacent to and around said opening in the wall of said pipe; (d) said outer end of said insert being adapted to operatively engage a take-off means; and (e) said insert housing having means adapted to receive and engage said take-off means such that said take-off means holds said insert in a sealing position around said opening in said pipe and against said take-off means.

Advantageously, the insert and housing include cooperating means for preventing rotational movement of said insert within said housing when said insert is positioned within said housing in an operative way. Preferably, the inner end of the insert is provided with opposing ears extending outwardly therefrom and adapted to fit into mating slots in the insert housing.

In one embodiment, this invention provides an insert for a pipe saddle assembly, said insert having an outer end, an opposite inner end and an opening extending through the insert from its inner end to its outer end, said inner end being adapted to conform to a surface of a pipe from which it is desired to take off a branch line, said insert having a circumferential groove in each of said ends, the circumferential groove in said inner end being adapted to receive a circular sealing means, the circumferential groove in said outer end being adapted to cooperate in a sealing manner with means for holding said insert against said pipe.

In another embodiment, the insert of this invention can be prepared without circumferential grooves in the ends thereof, it being only necessary that said insert be prepared from, for example, a high performance elastomer such as, for example, a polyester elastomer such as Hytrel®, which elastomers have a high load bearing capacity and low creep making it suitable for maintaining a tight seal for dynamic fluid containment.

DETAILED DESCRIPTION OF THE INVENTION

Figure 1:
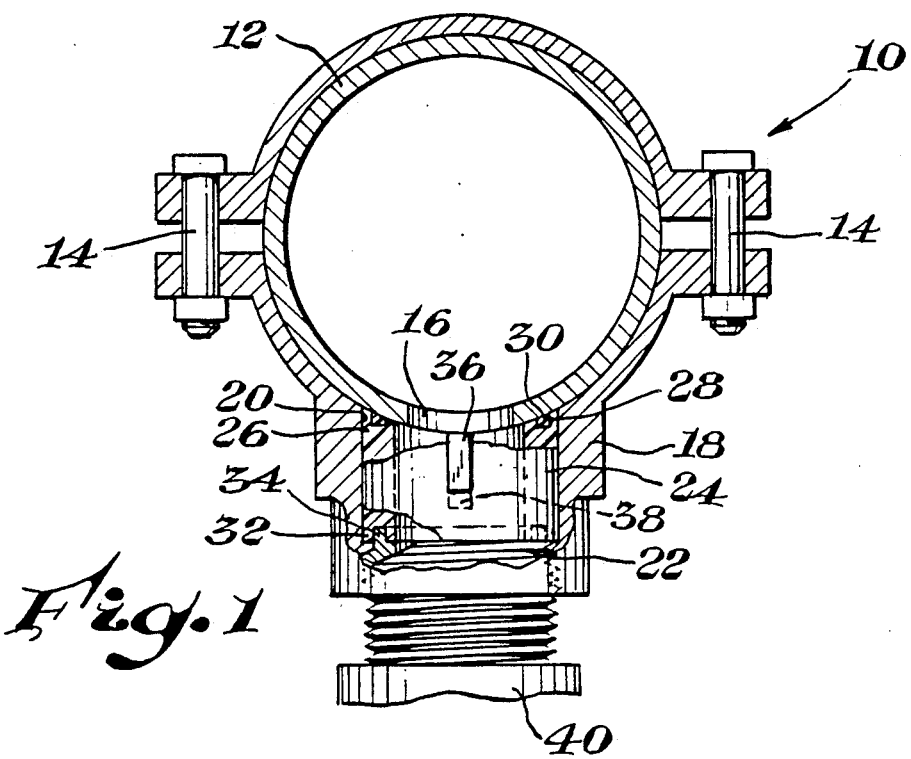
Figure 2:
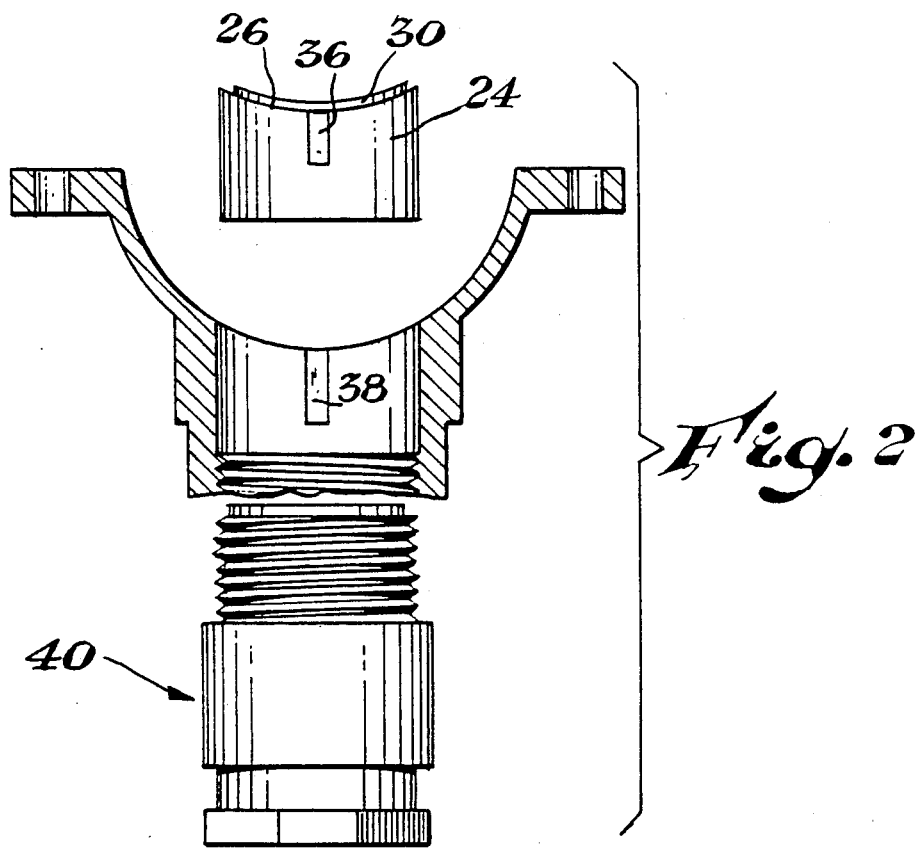

The invention will be further understood by reference to the accompanying drawings wherein FIG. 1 is a cross-sectional view of the pipe saddle assembly of this invention when in position on a main feeder pipe and FIG. 2 is an exploded view showing one embodiment of the insert of this invention, a portion of the service saddle and a take-off means.

With reference to FIG. 1, service saddle assembly 10 is shown attached to a feeder pipe 12 by means of lugs 14. Saddle assembly 10 is positioned over a tapped-in hole 16 and comprises insert housing 18 having an inner open end 20 and outer open end 22. Insert 24 is positioned within insert housing 18 and comprises inner end 26 which is adapted to fit the curvature of feeder pipe 12. Inner end 26 has a circumferential groove 28 which is adapted to contain a gasketting material 30. Insert 24 also comprises an outer end 32 having a circumferential groove 34 therein and opposed ears 36 adapted to fit into opposed grooves 38 in insert housing 18, thereby preventing rotational movement of the insert when tightening the take-off means to provide a water tight seal. Take-off means 40 is shown in position for service abutting insert 24 and holding said insert in sealing engagement around tapped-in hole 16. Advantageously, the inserted end of take-off means 40 is adapted to mate with groove 34 of insert 24 providing an additional sealing means. It has been found that simple hand tightening of take-off means 40 has provided a complete seal for water at 250 pounds pressure when employing the novel insert and saddle assembly of this invention.

The insert and assembly of this invention can be made of any of the normally used plastics or metal materials, it being only necessary that the materials be selected as appropriate for the fluids to be transferred in the pipes and for the particular type of insert to be employed.

As is readily apparent, the assembly of this invention can be fastened to the main feeder pipe at the desired location, the pipe can be tapped while under pressure by means known to those skilled in the art, after the saddle assembly is in position, and the branch line connected with a minimum of effort.

Various modifications may be made in the present invention without departing from the spirit or scope thereof and it is understood that I limit myself only as defined in the appended claims.

I claim:

1. An insert for a pipe saddle assembly, said insert having an outer end, an opposite inner end and an opening.

2. Insert of claim 1 including means for preventing rotational movement of said insert when said insert is positioned within said pipe saddle assembly in an operative way.

3. Insert of claim 2 wherein said means for preventing rotational movement comprise opposing ears extending outwardly from said insert.

* * * * *